United States Patent [19]
McCormack

[11] Patent Number: 5,246,261
[45] Date of Patent: Sep. 21, 1993

[54] SAFETY PARTITION FOR MOTOR VEHICLES

[76] Inventor: Bill McCormack, 510 Mango Ave., Sarasota, Fla. 34327

[21] Appl. No.: 907,655

[22] Filed: Jul. 2, 1992

[51] Int. Cl.⁵ .............................................. B60R 27/00
[52] U.S. Cl. .................................. 296/24.1; 296/901
[58] Field of Search ............................. 296/24.1, 901

[56] References Cited

U.S. PATENT DOCUMENTS

| | | | |
|---|---|---|---|
| 4,173,369 | 11/1979 | Roggin | 296/24.1 |
| 4,621,856 | 11/1986 | McKenzie | 296/24.1 |
| 4,938,518 | 7/1990 | Willemsen | 296/24.1 |
| 4,964,666 | 10/1990 | Dillon | 296/24.1 |
| 5,069,497 | 12/1991 | Clelland | 296/24.1 X |

Primary Examiner—Robert R. Song
Attorney, Agent, or Firm—Gifford, Groh, Sprinkle, Patmore & Anderson

[57] ABSTRACT

A one piece partition for the interior of van type vehicles molded of plastic material and extending transversely from side to side and from the roof to the floor with the partition being positioned directly behind the driver and passenger seats to give maximum cargo space in the rear compartment of the vehicle. A console extends forwardly from the partition into the forward compartment between the driver's and passenger's seats and opens rearwardly to elongate the storage space offered by the rear compartment. The entire perimeter of the partition and the bottom of the console is in close proximity to vehicle portions so installation is made by attaching means such as double sided tape fixed to the perimeters and to the adjacent vehicle portions to form a thermal and safety barrier between the compartments.

5 Claims, 3 Drawing Sheets

SAFETY PARTITION FOR MOTOR VEHICLES

FIELD OF INVENTION

This invention relates to partitions for vans, minivans or any other vehicle that has a special need or can be improved by separating the driver's compartment from the rear cargo area of the vehicle. It is of a unique one piece construction incorporating a window, giving a clear unobstructed view to the rear obtaining all the advantages of safety, maximizing climate control, maximizing utilization of available storage, simplicity of installation and conformation to the vehicle being modified. Various changes in the after described molding process provides for the incorporation of a console with inclusion of a beverage carrier, worksheets, and other uses within the driver's compartment, while maximizing the cargo area for extra elongated objects further enhancing and maintaining safety in an accident situation.

BACKGROUND OF THE INVENTION AND PRIOR ART

Numerous separate devices dividing the driver's compartment and the cargo area of vans and other vehicles have been utilized in the past. The purposes of these devices were to confine cargo in the proper area in case of accident, promote security, and attempt to maintain a temperature control in the driver's compartment.

These devices have been manufactured or designed with metal, aluminum, and fiberglass, either screwed or bolted to plexiglass to provide rear view vision. These partitions in many cases required, at best, awkward manufacturing techniques, and did not necessarily achieve what they were designed for.

It has been noted by some that their inventions will give greater cargo space, an attempt made by William P. McKenzie, U.S. Pat. No. 4,621,856, issued Nov. 11, 1986. This patent clearly achieves additional cargo space but evidently relies on the structural strength of the driver and passenger seats for support in the event that heavy moving objects move forward in an accident, since there is a lack of any supports on either side of the partition at the door post area. As recently noted in a television magazine show a common occurrence in accidents is where the rear seat breaks and the passenger slides through the seat belts resulting in an injury illustrating that the structural strength of the passenger seats is questionable. It can be further noted that without any side panels angling forward this partition does not achieve maximum climate control in the driver's compartment. Moreover, it has been determined by Mr. McKenzie that only three standard sizes of partitions are needed to fit most vans, mini vans and station wagons regardless of who they were manufactured by as if to say three sizes of shoes fit all people. To achieve cargo space and maintain maximum climate control in the driver's compartment, the partition should be designed to fit that particular model of vehicle. Generally motor vehicles are designed by the major manufacturers to maintain the same model style for a period of approximately ten (10) years. The instant invention can be utilized on any particular model for a like period of time.

James A. Willemsen, U.S. Pat. No. 4,938,518 issued Jul. 3, 1990, explains in detail that his drawings are for illustration purposes only and that they should be accepted as that. But, if one considers the location of seats in the various vehicles for which the partition is intended, an obvious conclusion is that the partition because of the vertical nature of its design has to be moved considerably toward the rear of the vehicle to provide space for the seats and thereby reducing the cargo area. The sole advantage of his partition is its flexible strips hanging downward as needed to reach the seats, obviously having no structural strength to this particular invention.

It should also be noted that both above mentioned patents require nuts, bolts, screws, and brackets to secure their partitions not only together but in place. While the present invention does not.

In U.S. Pat. No. 3,632,154, issued Jan. 4, 1972, Mr. Woodrich discloses a clear, flexible transparent partition to separate the cargo area from the driver's compartment to obtain climate control. This partition fits behind the driver's seat and extends from the ceiling to the floor and side to side. This would be an obvious reduction of the cargo area and because of its flexible nature provides little protection in an accident.

Mr. Roggin, U.S. Pat. No. 4,173,269, issued Nov. 6, 1979, attempts to separate the driver's compartment from the rear seat area of an automobile with a fiberglass lower barrier and a plexiglass upper panel for means of viewing to the rear which extends the full width of the vehicle. He has multiple "bolt on" side panels and the invention's primary intent is for security purposes such as is utilized in taxicabs and police vehicles. It is an elaborate and complicated manufacturing feat to construct and install because of its intended function.

SUMMARY OF INVENTION

The present invention is a needed safety partition having the ability to overcome almost all shortcomings of heretofore prior art due to its thermal forming process. The mold fitting process allows unused space in various vehicles to become useable space. The partition of one-piece construction has the ability to curve in more than one direction, conforms to any given space with the incorporation of a window for viewing to the rear.

The instant invention has many of the characteristics and is much like that of a pick-up truck rear cab panel situated immediately behind the seats. The partition is a one-piece panel extending from side to side and ceiling to floor of the vehicle conforming to the exact configuration inside the bulkhead of the vehicle, thus forming an almost air tight barrier behind the front seats and door post of the vehicle. In many full size and mini vans, the manufacturer has installed a factory headliner in the driver's compartment which extends behind and above the driver's head. This is an ideal location to affix the partition to the ceiling giving it a mounting location and extending a factory finished appearance to the panel.

The partition extends from the ceiling downwardly to the top of the seats and at an angle downwardly and forwardly following the back of the seats and goes to the floor, while at the same time curves at the outside edge of the seats and goes forward to the door post. For the application in vans, a transverse convex cavity can be formed for a console, a much needed area to keep drinks in their proper places, two-way radios that heretofore were affixed under the dashboard of the vehicles, and worksheets that in the past were thrown upon the dashboard, in some cases obstructing the driver's view.

With the provision of a console extending forwardly from the partition, a cavity is open rearwardly to the cargo area which offers available space for elongated objects that are longer than would normally fit from the partition to the rear doors of the vehicle and still maintain safety.

The method of manufacturing has the ability to curve the panel in whatever shape is needed to conform to roof, floor and the width of the vehicle. To have the panel curve to the shape of the front seats and forward to the door post all from one panel plus the added console cavity, all gives structural strength to the partition in an accident situation. The present invention has a plexiglass or Lexan (trademark) window to give an unobstructed view to the rear. This window is mounted in the upper half of the partition and between the seats. It is mounted in a self-locking rubber, much like that which is used to mount windshields and rear windows in some trucks. The method of installation is not only quick, it has a factory appearance. Whereas the mounting of the invention itself overcomes prior art, here again it can be contributed to the manufacturing process. Its ability to curve two different ways at the same time enables the invention to curve to the ceiling, floor and door post perfectly, so all that is needed because of the close tolerance, is a double sided tape and or self tapping screws affixed to ceiling, floor and door post.

One feature that heretofore has not been achieved but the present invention can accomplish is security. A partition that fits so close to all surrounding areas, it almost becomes a part of the vehicle. It enables the driver to lock the cab section without locking the cargo area, or the reverse. This provides maximum advantage to the user making multiple deliveries.

If one would consider the fuel consumption by the vehicles engine to heat and or air condition the entire cubic feet of the inside of a vehicle, with the present invention, one would conclude with its ability to physically separate compartments, a fuel savings would be realized. There is another savings in this invention in that it utilized far less expensive materials than Lexan (trademark) or plexiglass as incorporated in other inventions. It has a far easier method of installation being installed by two-sided or double-sided tape that is presently used by the automotive industry on installations of side moldings, bumpers, etc. It is interchangeable between the various models of the automotive industry i.e. Chevrolet and GMC products as well as Dodge and Plymouth products manufactured by General Motors and Chrysler, respectively. As initially discussed the particular panel can be used over a period of years coinciding with the design period of the various models.

DESCRIPTION OF THE PREFERRED EMBODIMENTS

Figure 1:
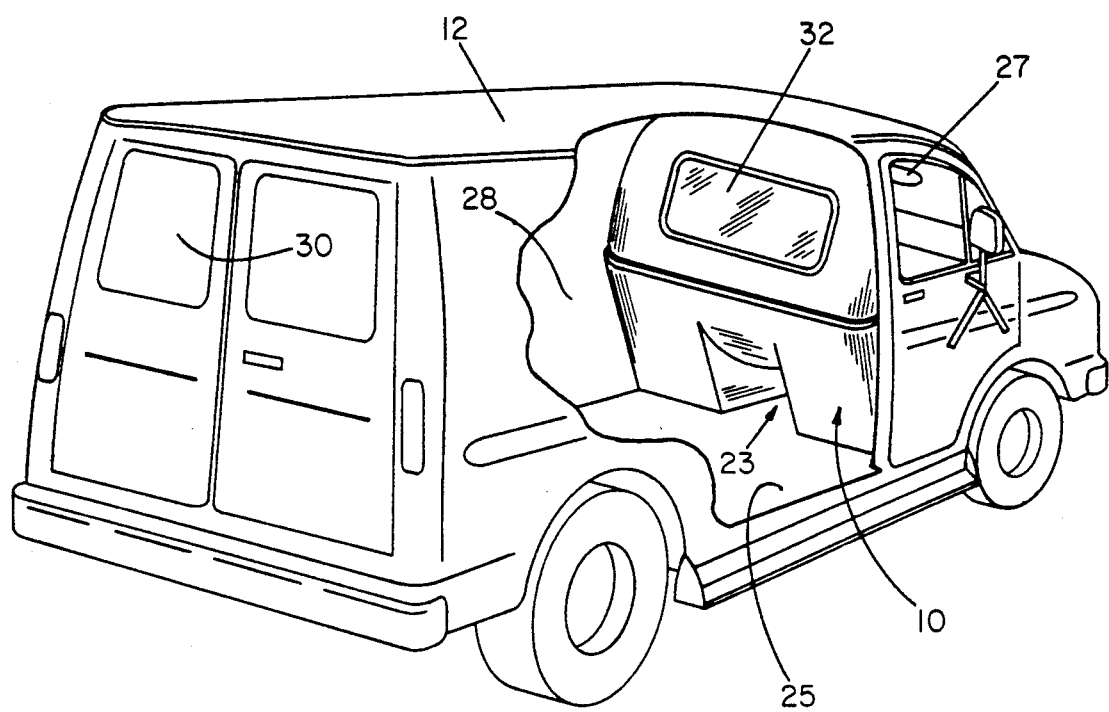
FIG. 1 is a perspective view of the present invention mounted in a van type vehicle.
Figure 2:
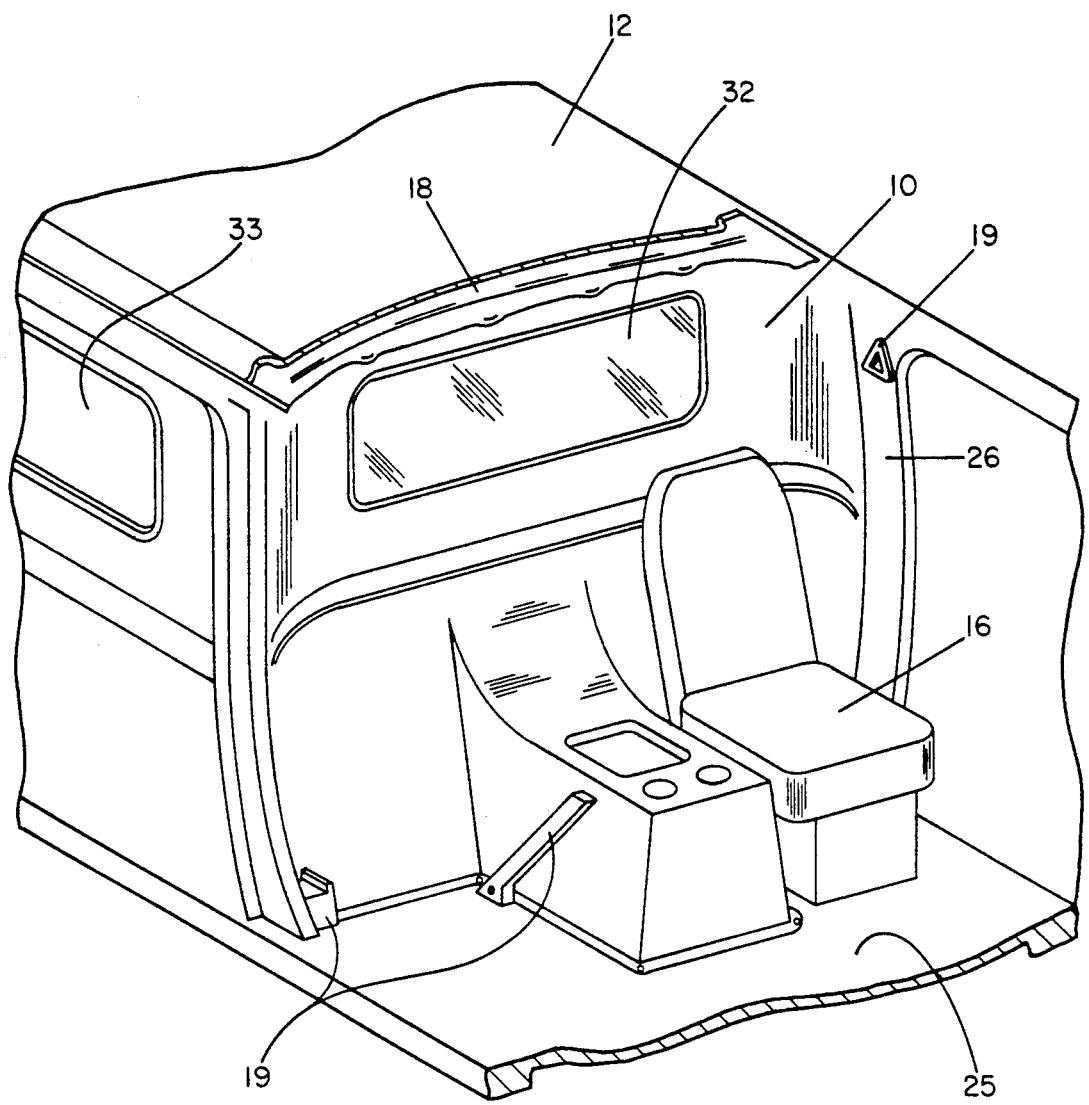
FIG. 2 is a front oblique view of the present invention mounted in a van type vehicle.

In FIG. 1, there is shown a cut away view of the partition 10 of the present invention mounted in a van type vehicle 12. FIG. 2 shows a crossrib 18 above and behind the driver's seat 16, where crossrib 18 attaches to roof there is mounted at the manufacturer, a factory headliner in some cases. At this crossrib 18 the present partition 10 is made to conform to said rib 18, across the width of the vehicle 12. FIG. 2 shows partition 10 coming downward and forward at an angle, following the back of the seats 16 to the floor 25. At same time, partition 10 curves at the outside edge of the seats 16 and goes forwardly to door post 40.

With a change in the mold process, a console 20 can be added to partition 10 as shown in FIG. 2. Console is made to fit between seats 16 without obstructing any safety belt hook-ups 19 or access to motor lid cover. Console is made tall enough to be comfortable for driver's access and forms a cavity 23 that opens to the rear compartment or cargo area 28 as shown in FIG. 1 to take advantage of all of the useable space and still maintain a safety barrier.

Figure 3:
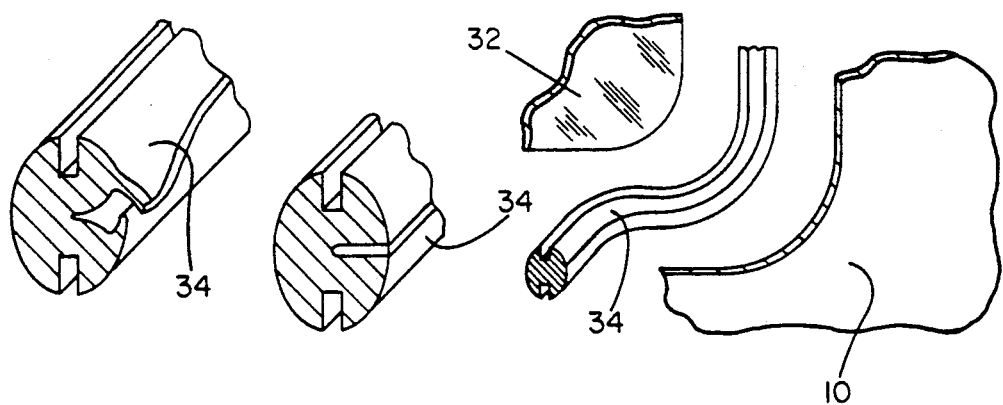
FIG. 3 is an enlarged view of the embodiment that mounts the window to the safety partition.
Figure 4:
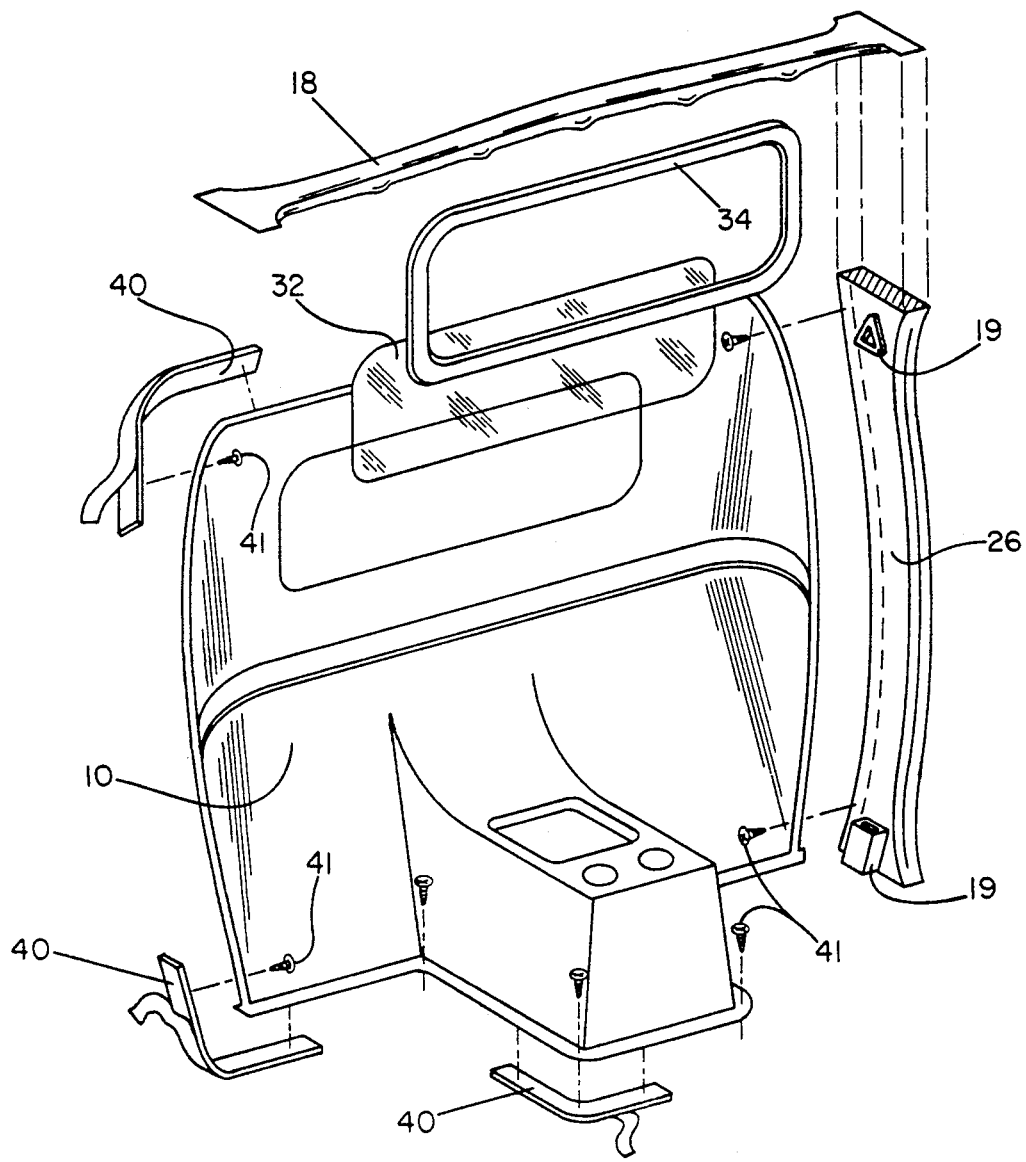
FIG. 4 is a perspective view of the safety partition showing a detailed view of attaching means and mounting means.

As shown in FIG. 1, in the upper half of partition 10 is a window 32, which is in direct line with the rear view mirror 27 and rear windows 30. The window 32 is of a size that gives the driver an unobstructed view, not only to the mirror 27 and windows 30 but to the side window 33 that some vans have in cargo doors. That is to say, that at a glance by the driver, he will not notice partition 10 as being an obstruction. The window 32 is made of plexiglass or Lexan (trademark) and is mounted in partition 10 with a self-locking rubber 34 as shown in FIG. 4 and more closely in FIG. 3. This method of installation requires no bolts, nuts, or screws and gives a factory appearance.

As shown in FIG. 4 mounting of partition 10 is done with a double sided tape 40 applied all around the outside edge or perimeter of partition 10 and console 20. With partition 10 sitting in place in the vehicle 12, protective paper backing is removed from tape 40 and pressure is applied from the other side of partition 10 to all surrounding mounting areas of the vehicle such as, rib 18, door post 40, and floor 25. If areas should appear where tape 40 does not adhere well, self tapping screws 41, can be used to these areas. But with tape 40 applied all around perimeters of partition 10 including console 20 this should not be necessary.

It will be apparent to those having an ordinary skill in this field of art, that many different configurations can be conceived with the preferred embodiment of the present invention. Not only the advantages of heating and cooling for the driver's compartment, but gaining total cargo space availability, plus security, and a partition to withstand impact in an accident, all from a one piece partition. Design variations of the present invention are to be considered when applied to different manufacturers of vans, automobiles and the like.

Here I claim:

1. A partition for a motor vehicle of the van type having a pair of seats, comprising:
    a one piece panel molded of plastic material and extending transversely of the vehicle for the full width and height of the interior of the vehicle and separating the interior of said vehicle into a rear compartment and a front compartment, said partition extending from the ceiling of the vehicle downwardly to the top of back rests of the vehicle seats and then downwardly and forwardly at the rear of the seats to extend to the floor, opposite side edges of said partition being curved forwardly to extend to door posts of the vehicle, a console connected with said partition and extending forwardly between the seats and into said front compartment, said console having a perimeter adjacent the floor and forming a cavity opening into said rear compartment of said vehicle to present an elongated storage space, the entire perimeters of said partition and console being in close proximity to portions of the vehicle, and means for attaching the perimeters of said partition and console to said vehicle to create a thermal and safety barrier between the front and rear compartments.

2. The safety partition of claim 1 and further comprising a transparent, rigid window mounted in said partition.

3. The safety partition of claim 1 in which said console is molded integrally with said partition.

4. The safety partition of claim 1 wherein said means for fastening said partition to said vehicle includes a double sided tape affixed substantially around the edges of said partition to be in contact with the latter and with said vehicle.

5. The safety partition of claim 1 wherein said means for fastening said partition to said vehicle including self tapping screws.

* * * * *